(12) United States Patent
Saville et al.

(10) Patent No.: US 6,493,781 B1
(45) Date of Patent: Dec. 10, 2002

(54) SERVICING OF INTERRUPTS WITH STORED AND RESTORED FLAGS

(75) Inventors: Winthrop L. Saville, Soquel, CA (US); Kevin Ross, Sunnyvale, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/377,358

(22) Filed: Aug. 19, 1999

(51) Int. Cl.[7] .............................................. G06F 13/24
(52) U.S. Cl. ...................................... 710/260; 710/267
(58) Field of Search ................................. 710/260–266

(56) References Cited

U.S. PATENT DOCUMENTS

| 4,930,068 | A | * | 5/1990 | Katayose et al. ............ 710/260 |
| 5,070,447 | A |   | 12/1991 | Koyama ..................... 395/725 |
| 5,161,228 | A |   | 11/1992 | Yasui et al. ................. 395/725 |
| 5,410,708 | A | * | 4/1995 | Miyamori .................... 710/264 |
| 5,471,595 | A |   | 11/1995 | Yagi et al. ................... 395/375 |
| 5,530,597 | A | * | 6/1996 | Bowles et al. ............... 710/262 |
| 5,542,076 | A | * | 7/1996 | Benson et al. .............. 710/260 |
| 5,615,375 | A | * | 3/1997 | Ibusuki et al. .............. 710/264 |
| 5,619,704 | A |   | 4/1997 | Yagi et al. ................... 395/735 |
| 5,659,760 | A | * | 8/1997 | Enami ......................... 710/269 |
| 6,038,607 | A | * | 3/2000 | Hamilton et al. ........... 709/236 |
| 6,061,787 | A | * | 5/2000 | Seshan ........................ 712/244 |
| 6,112,260 | A | * | 8/2000 | Colterjohn et al. .......... 710/31 |
| 6,112,274 | A | * | 8/2000 | Goe et al. .................... 710/260 |
| 6,212,593 | B1 | * | 4/2001 | Pham et al. ................ 710/266 |

FOREIGN PATENT DOCUMENTS

| EP | 0441054 A1 | 8/1991 | ............ G06F/9/46 |
| EP | 0652514 A2 | 11/1994 | ............ G06F/9/46 |
| EP | 0827084 A2 | 3/1996 | ............ G06F/13/24 |
| WO | WO9744732 | 11/1997 | ............ G06F/9/46 |

OTHER PUBLICATIONS

Intel: "Microprocessor and Peripheral Handbook vol. 1" 1988, Intel, Santa Clara, US XP002152077 p. 2–11.
Philips: "8051 Based 8 Bit Microcontrollers, Data Handbook Integrated Circuits, Book IC20" 1991, Philips, Netherlands XP00215078, p. 18–19 Figure 18.

* cited by examiner

Primary Examiner—Rupal Dharia

(57) ABSTRACT

A method is provided for avoiding the corruption of information which can occur when a processor nests subroutines and these subroutines disable and enable interrupts.

7 Claims, 3 Drawing Sheets

| Step | IR | IE | Inst. # | Count | A0 | A1 |
|------|----|----|---------|-------|----|----|
| 1 | 1 | 1 | Switch to Produce Info | | | |
| 2 | 0 | 1 | 1 | 0 | ? | 1 |
| 3 | 0 | 1 | 2 | 0 | ? | 1 |
| 4 | 0 | 0 | 10 | 0 | ? | 1 |
| 5 | 0 | 0 | 11 | 0 | 0 | 1 |
| 6 | 0 | 0 | 12 | 0 | 1 | 1 |
| 7 | 0 | 0 | 13 | 1 | 1 | 1 |
| 8 | 0 | 1 | 14 | 1 | 1 | 1 |
| 9 | 0 | 1 | 15 | 1 | 1 | 1 |
| 10 | 0 | 1 | 3 | 1 | 1 | 1 |
| 11 | 0 | 1 | 1 | 1 | 1 | 1 |
| 12 | 0 | 1 | 2 | 1 | 1 | 1 |
| 13 | 0 | 0 | 10 | 1 | 1 | 1 |
| 14 | 0 | 0 | 11 | 1 | 1 | 1 |
| 15 | 1 | 0 | 12 | 1 | 2 | 1 |
| 16 | 1 | 0 | 13 | 2 | 2 | 1 |
| 17 | 1 | 1 | 14 | 2 | 2 | 1 |
| 18 | 1 | 1 | Switch to Consume Info | | | |
| 19 | 0 | 1 | 4 | 2 | 2 | ? |
| 20 | 0 | 1 | 5 | 2 | 2 | ? |
| 21 | 0 | 1 | 6 | 2 | 2 | ? |
| 22 | 0 | 1 | 7 | 2 | 2 | -1 |
| 23 | 0 | 1 | 8 | 2 | 2 | -1 |
| 24 | 0 | 0 | 10 | 2 | 2 | -1 |
| 25 | 1 | 0 | 11 | 2 | 2 | -1 |
| 26 | 1 | 0 | 12 | 2 | 1 | -1 |
| 27 | 1 | 0 | 13 | 1 | 1 | -1 |
| 28 | 1 | 1 | 14 | 1 | 1 | -1 |
| 29 | 1 | 1 | Switch to Prev Produce Info | | | |
| 30 | 0 | 1 | 15 | 1 | 2 | 1 |
| 31 | 0 | 1 | 3 | 1 | 2 | 1 |
| 32 | 0 | 1 | 1 | 1 | 2 | 1 |
| 33 | 0 | 1 | 2 | 1 | 2 | 1 |
| 34 | 0 | 0 | 10 | 1 | 2 | 1 |
| 35 | 0 | 0 | 11 | 1 | 1 | 1 |
| 36 | 0 | 0 | 12 | 1 | 2 | 1 |
| 37 | 1 | 0 | 13 | 2 | 2 | 1 |
| 38 | 1 | 1 | 14 | 2 | 2 | 1 |
| 39 | 1 | 1 | Switch to Prev Consume Info | | | |
| 40 | 0 | 1 | 15 | 2 | 1 | -1 |
| 41 | 0 | 1 | 9 | 2 | 1 | -1 |

FIG. 2

Produce Info
```
        // produce some information
        // ...
        // increment the count
1       A1 = 1
2       Call Update Count
3       Jump to Produce Info
```

Consume Info
```
        // wait for information
        // ...
4       A0 = count
5       Test A0
6       If A0=0, Jump to Consume Info
        // consume the information
        // ...
        // decrement the count
7       A1 = -1
8       Call Update Count
9       Jump to Consume Info
```

Update Count
```
10      Push & Disable Int
11      A0 = count
12      A0 = A0 + A1
13      count = A0
14      Restore Int
15      Return
```

FIG. 3

SERVICING OF INTERRUPTS WITH STORED AND RESTORED FLAGS

BACKGROUND OF THE INVENTION

1. Field of the Invention

The invention relates to the servicing of interrupts and, in particular to the servicing of interrupts in connection with nested subroutines.

2. Description of Related Art

In processing systems, it is common to utilize interrupt servicing subroutines to facilitate the processing of multiple demands for shared resources, e.g. memories. These subroutines typically include instructions for disabling further interrupts, until completion of the current interrupt, and then re-enabling interrupts. The primary purpose of this disable/enable feature is to ensure that conflicting demands for the same resources are serviced without corrupting already-existing information.

In some situations, the simple acts of disabling and then re-enabling interrupts in beginning and end portions, respectively, of each interrupt subroutine are inadequate to prevent the corruption of information. For example, it is sometimes desirable to permit nesting of a second subroutine within a first, each of which includes its own disable and enable interrupt instructions. The end of the nested second subroutine can include an enable interrupt instruction followed by a return instruction to effect return to and completion of the first subroutine. However, if a request for servicing another interrupt is pending when the nested second subroutine issues its enable interrupt instruction, the other interrupt could be serviced by a third subroutine before completion of the first. If the third subroutine is sharing memory locations still being used by the first subroutine, the third subroutine could modify and inadvertently corrupt information in these shared memory locations. Alternatively, these memory locations could contain incorrect information, e.g. memory addresses which had not yet been updated by the first subroutine. In this case the third subroutine could either read or store information at an incorrect address.

A known solution to this problem is to first store pertinent data (e.g. a processor status word) relating to the status of a processor performing the nested subroutines, disable interrupts to facilitate performance of one of the subroutines, and then to read the stored data and restoring the processor to its earlier status before reenabling interrupts. This solution is both time and memory consuming.

European Patent 441054 discusses this problem generally and proposes as a solution a combination of register banks, status bits and interrupt logic for servicing interrupts. It is desirable to provide a simpler solution.

SUMMARY OF THE INVENTION

It is an object of the invention to provide a simple method for servicing interrupts that effectively avoids the problem of corrupting information stored in memory.

Note that the word "memory", as used herein, is intended to be interpreted as generally as is consistent with the manner in which it is used and includes, without limitation, volatile and non-volatile devices of various types, such as registers, RAMs, DRAMs, ROMs, LiFOs, FIFOs, etc.

In accordance with the invention, in the operation of a processor having the capability of performing nested subroutines in response to requested interrupts, a method of servicing such interrupts includes:

providing an indicator representing a current interrupt enable status;

saving status data including the indicator;

placing the current interrupt enable status in a disabled state;

at least beginning performance of an action designated by the requested interrupt;

before accepting another interrupt request:
reading the indicator from the saved status data;
placing the current interrupt enable status in the state indicated by the indicator.

BRIEF DESCRIPTION OF THE DRAWING

FIG. 2 is a table demonstrating an exemplary sequence of operations employing an embodiment of a method in accordance with the invention.

FIG. 3 is a diagram illustrating exemplary interrupt subroutines utilized in the embodiment.

DESCRIPTION OF THE PREFERRED EMBODIMENT

Figure 1:
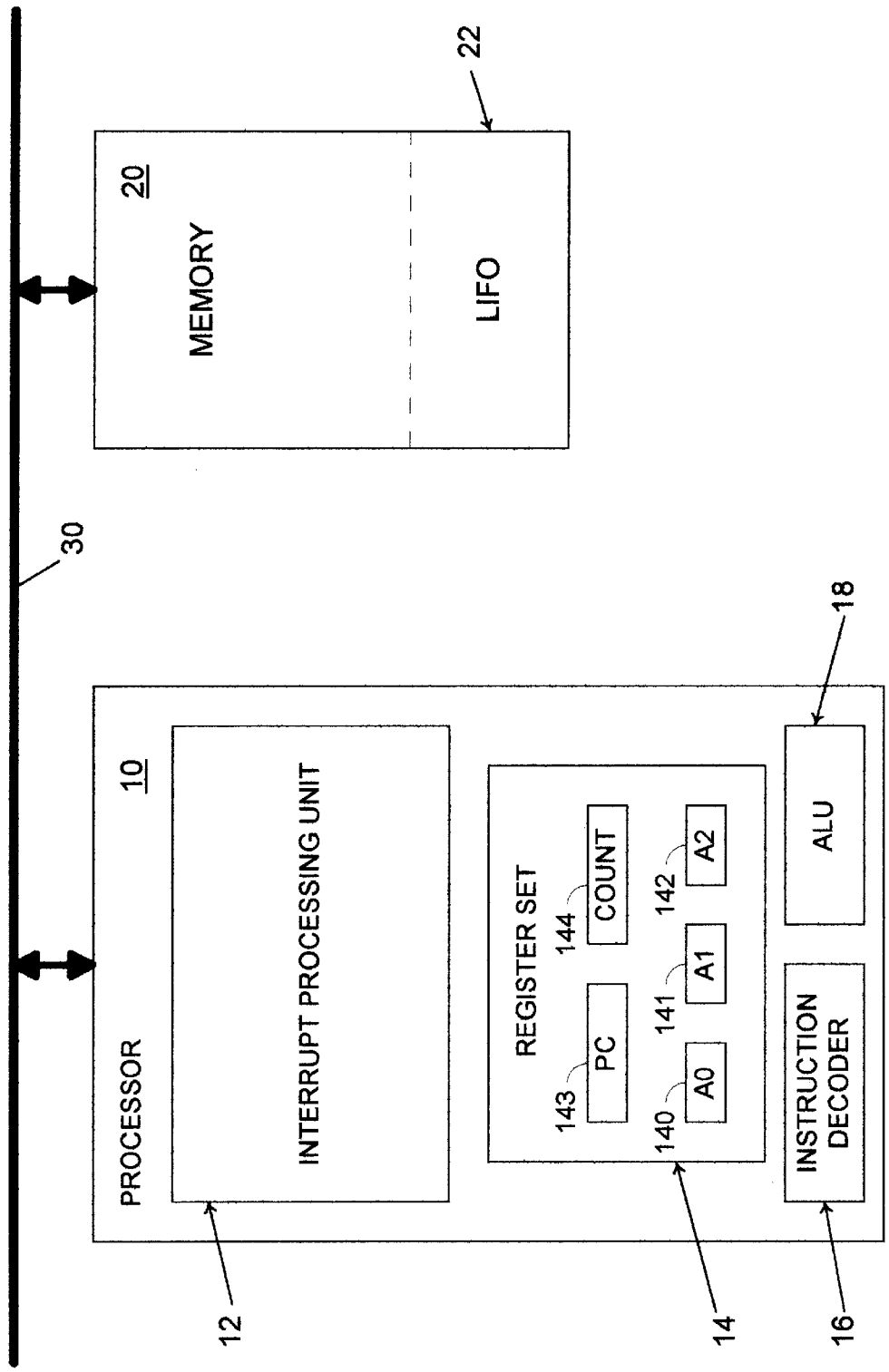
FIG. 1 is a diagram illustrating a processing system which is capable of servicing interrupts in accordance with an embodiment of the invention.

The processing system of FIG. 1 includes a processor 10, a memory 20 and a bus 30. The exemplary processor 10 utilizes clock pulses to sequence through instructions identified by a program counter register. Typically, the program counter register contains the memory location of the next instruction to be read and acted upon by the processor 10.

The processor 10 includes an interrupt servicing unit 12, a register set 14, an instruction decoder 16 and an arithmetic logic unit 18. The memory 20, in this exemplary embodiment, comprises a RAM (not shown) having a multiplicity of memory locations for storing, inter alia, subroutines and data. In the preferred embodiment, a portion of the memory 20 is utilized as a LIFO stack 22.

The processor 10 and the memory 20 are connected to the bus 30 for communicating with each other and with other hardware that is connected to the bus. The bus includes respective lines for carrying information such as addresses, interrupts, data, read strobes, write strobes and device-select strobes.

Operation of the processor 10 is controlled by instructions in the program stream and by interrupts. The interrupts may be either external interrupts received from the bus 30 or internal interrupts generated within the processor 10 itself, e.g., from a timer (not shown) in the processor 10.

All of the interrupts are serviced by the interrupt servicing unit 12, which produces addresses identifying the memory locations that are associated with the external and internal interrupts. In response to any interrupt, unit 12 produces an address identifying the location in the memory 20 of the corresponding interrupt subroutine. Preferably. the interrupt servicing unit 12 comprises a dedicated priority-sensitive hardware component (not shown) for producing the addresses, such as a programmable look-up table or an encoder, both of which are well known in the art. This both maximizes speed and enables servicing of higher priority interrupts before lower priority interrupts.

The register set 14 comprises a plurality of registers for containing updatable memory addresses and variables produced by the interrupt subroutines. In the preferred embodiment, the register set 14 includes:

variables registers 140,141,142 for holding respective variables A0,A1,A2;

a program counter register 143 for holding a continually updated address PC of the next instruction in the memory 20 to be accessed;

a counter register 144 for holding a count indicating a number of pieces of information waiting to be used;

one or more general purpose registers (not shown); and one or more data registers (not shown) for containing data which is either read from the memory 20 or produced by the arithmetic logic unit 18.

The instruction decoder 16 is a conventional hardware component, such as a sequencer or micro-sequencer, for converting the instructions read from the memory 20 to lower-level operation codes to be executed by the arithmetic logic unit 18. The arithmetic logic unit 18 is also a conventional hardware component.

FIG. 2 illustrates a typical example of sequential steps that would be performed by the processor 10 in servicing a plurality of interrupts in accordance with a preferred embodiment of the invention. Interrupt subroutines that are utilized in this example are:

a Produce Info subroutine for producing information;

a Consume Info subroutine for using the information produced by the Produce Info subroutine;

an Update Counter subroutine for updating the count in the register 144.

The column headings in the table have the following meanings:

The symbol IR represents the state of an interrupt request flag, with a "1" indicating that an interrupt request is being received and a "0" indicating that no interrupt request is being received.

The symbol IE represents the state of an interrupt enable flag, with a "1" indicating that this flag is set (i.e. interrupts are currently enabled) and a "0" indicating that this flag is reset (i.e. interrupts are currently disabled).

"Inst. #" indicates the number of the instruction currently being executed by the processor 10.

"Count" is the number currently contained in register 144, i.e. the number of pieces of already-produced information waiting to be consumed.

The symbols A0 and A1 represent the current values of these variables, which are stored in the registers 140 and 141, respectively.

FIG. 3 illustrates the exemplary subroutines, with each instruction that is included in the subroutines being preceded by the respective Instruction #.

The example illustrated in FIG. 2 will now be described with reference to FIG. 3. Note that in this example it is assumed that, prior to step 1, the interrupt enable flag is set (IE=1) and the count in register 144 has been initialized to the value 0, indicating that no information is waiting to be consumed.

In step 1, an interrupt request is received (IR=1) to produce information. The processor 10 responds to this request by switching from whatever routine it had been performing to the interrupt subroutine Produce Info.

In steps 2 and 3, the processor 10 resets the interrupt request flag, produces information and stores it in the memory 20, and executes Instructions #1 and #2 of the Produce Info subroutine. Specifically:

In step 2, it resets the interrupt request flag (IR=0) and executes Inst. #1, i.e. sets the value of variable A1 (in register 141) equal to 1. (The value of the variable A0 is indeterminite at this time.)

In step 3, it executes Inst. #2, i.e. calls the subroutine Update Count.

In steps 4 through 9, the processor 10 performs the called Update Count subroutine. Specifically:

In step 4, it executes Inst. #10, i.e. Push & Disable Int. In accordance with this instruction, the processor 10 first saves the current state of the interrupt enable flag (IE=1) by pushing it into the LIFO stack 22. If it is desired to save additional information (e.g. the current states of other flags), this additional information is also pushed into the stack 22 at this time. The processor 10 then resets the interrupt enable flag (IE=0), thereby disabling further interrupts until updating of the count in register 144 is completed.

In step 5, it executes Inst. #11 by setting the value of the variable A0 (in register 140) equal to the current value of the count in register 144, i.e. A0=0.

In step 6, it executes Inst. #12 by calculating the sum A0+A1=1 and saving this sum in register 140 as a new value for A0.

In step 7, it executes Inst. #13 by saving the new value of A0 in register 144 as a new value for the count, i.e. count=1.

In step 8, it executes Inst. #14, i.e. Restore Int. In accordance with this instruction, the processor 10 restores the interrupt enable flag to the state IE=1, which was saved in the LIFO stack in step 4, when Inst. #10 was executed. (If additional information was saved in step 4, such information is discarded at this time.)

In step 9, it executes Inst. #15, i.e. Return. In accordance with this instruction, the processor 10 returns to the subroutine that was previously being performed, i.e. to the Produce Info subroutine.

In step 10, the processor 10 executes the next instruction to be executed in the Produce Info subroutine, i.e. Inst. #3, Jump to Produce Info. This simply restarts the Produce Info subroutine. y In steps 11 and 12, the processor 10 produces information, stores it in the memory 20 and executes Instructions #1 and #2 of the Produce Info subroutine. Specifically:

In step 11, it executes Inst. #1 by reinitializing the variable A1 to the value 1.

In step 12, it executes Inst. #2 by calling the Update Count subroutine.

In steps 13 through 17, the processor 10 undertakes performance of the called Update Count subroutine, during which an interrupt request is received. Specifically:

In step 13, it executes Inst. #10 (Push & Disable Int) by first saving the current state of the interrupt enable flag (IE=1) in the LIFO stack 22. It then resets the interrupt enable flag (IE=0), thereby disabling further interrupts until updating of the count in register 144 is completed.

In step 14, it executes Inst. #11 by setting the value of variable A0 equal to the current value of the count, i.e. A0=1.

In step 15, it executes Inst. #12 by calculating the sum A0+A1=2 and saving this sum in register 140 as a new value for A0. During this step, it also receives an interrupt request, which it will ignore until interrupts are again enabled in accordance with Inst. #14.

In step 16, it executes Inst. #13 by saving the new value of A0 in register 144 as a new value for the count, (count=2).

In step 17, it executes Inst. #14 by restoring the interrupt enable flag to the state IE =1, which was saved in the LIFO stack 22 in step 13, when Inst. #10 was last performed.

In step 18, the processor 10 responds to the interrupt request received in step 15, which is a request to consume information. It responds by switching to the Consume Info subroutine.

In step 19, the processor 10 resets the interrupt request flag (IR=0) and then proceeds with performance of the Consume Info subroutine. Specifically:

In step 19, it executes Inst. #4 by setting the value of variable A0 equal to the current value of the count, i.e. A0=2.

In step 20, it executes Inst. #5, i.e. Test A0, by reading the current value of A0 (now equal to the count) from register 140.

In step 21, it executes Inst. #6 by comparing the value of A0 to 0. If A0=0, indicating that no information in the memory 20 is waiting to be consumed, the processor 10 jumps back to the beginning of the Consume Info subroutine.

However, in this case A0=2, indicating that 2 pieces of information in memory are waiting to be consumed. Thus, the processor 10 consumes the last piece of information that was stored and then proceeds with the remaining instructions in this Consume Info subroutine to decrement the count accordingly.

In step 22, it executes Inst. #7 by setting the value of variable A1 (in register 141) equal to −1.

In step 23 it executes Inst. #8 by calling the Update Count subroutine.

In steps 24 through 28, the processor 10 undertakes performance of the called Update Count subroutine, during which an interrupt request is received. Specifically:

In step 24, it executes Inst. #10 (Push & Disable Int) by first saving the current state of the interrupt enable flag (IE=1) in the LIFO stack 22. It then resets the interrupt enable flag (IE=0), thereby disabling further interrupts until updating of the count in register 144 is completed.

In step 25, it executes Inst. #11 by setting the value of variable A0 equal to the current value of the count, i.e. A0=2. During this step, it also receives an interrupt request, which it will ignore until interrupts are again enabled in accordance with Inst. #14.

In step 26, it executes Inst. #12 by calculating the sum A0+A1=2−1=1 and saving this sum in register 140 as a new value for A0.

In step 27, it executes Inst. #13 by saving the new value of A0 in register 144 as a new value for the count, (count=1).

In step 28, it executes Inst. #14 by restoring the interrupt enable flag to the state IE =1, which was saved in the LIFO stack 22 in step 24, when Inst. #10 was last executed.

In step 29, the processor 10 responds to the interrupt request received in step 25, which is a request to switch to the previously-running Produce Info subroutine.

In step 30, the processor 10 resets the interrupt request flag (IR=0) and retrieves from memory 20 the values of A0 and A1 that existed when the previous Produce Info subroutine was interrupted (i.e. in step 17, where A0=2 and A1=1). It then executes the Return instruction (Inst. #15) to effect return to the previous Produce Info subroutine. Then the processor 10 executes the next successive instruction in the Produce Info subroutine, i.e. Inst. #3.

In step 31, the processor 10 executes Inst. #3 by jumping to the beginning of the Produce Info subroutine.

In steps 32 and 33, the processor 10 produces information, stores it in the memory 20 and executes Instructions #1 and #2 of the Produce Info subroutine. Specifically:

In step 32, it executes Inst. #1 by reinitializing the variable A1 to the value 1.

In step 33, it executes Inst. #2 by calling the Update Count subroutine.

In steps 34 through 38, the processor 10 again undertakes performance of the Update Count subroutine, during which another interrupt request is received. Specifically:

In step 34 it executes Inst. #10 (Push & Disable Int) by first saving the current state of the interrupt enable flag (IE=1) in the LIFO stack 22. It then resets the interrupt enable flag (IE=0), thereby disabling further interrupts until updating of the count in register 144 is completed.

In step 35, it executes Inst. #11 by setting the value of variable A0 equal to the current value of the count, i.e. A0=1.

In step 36, it executes Inst. #12 by calculating the sum A0+A1=2 and saving this sum in register 140 as a new value for A0.

In step 37, it executes Inst. #13 by saving the new value of A0 in register 144 as a new value for the count, (count=2). During this step, it also receives an interrupt request, which it will ignore until interrupts are again enabled in accordance with Inst. #14.

In step 38, it executes Inst. #14 by restoring the interrupt enable flag to the state IE =1, which was saved in the LIFO stack 22 in step 34, when Inst. #10 was last performed.

In step 39, the processor 10 responds to the interrupt request received in step 37, which is a request to switch to the previously-running Consume Info subroutine.

In step 40, the processor 10 resets the interrupt request flag (IR=0) and retrieves from memory 20 the values of A0 and A1 that existed when the previous Consume Info subroutine was interrupted (i.e. in step 28, where A0=1 and A1=−1). It then executes the Return instruction (Inst. #15) to effect return to the previous Consume Info subroutine. The processor 10 then executes the next successive instruction in the Consume Info subroutine (i.e. after Inst. #8, which was executed in step 23).

In step 41, the processor 10 executes the next successive instruction in the Consume Info subroutine, i.e. Inst #9, by jumping to the beginning of this subroutine.

Following step 41 the processor 10 will continue to operate in similar fashion. The exemplary steps shown in FIG. 2 are provided to demonstrate how the servicing of interrupts, in accordance with an embodiment of the invention, can be done effectively in a simple manner, with few instructions, by saving minimal information, and without the need for specialized hardware.

Note that the sequence described above and illustrated in FIG. 2 is an exemplary embodiment that is provided only to aid in understanding of the invention. It is not intended to limit the scope of the invention. For example, only a single-bit code is utilized for the interrupt request status (IR) and for the interrupt enable status (IE). As is well known in the art, however, some processors are capable of simultaneously responding to multiple interrupt requests and of tracking multiple interrupt enable statuses. The present invention is equally capable of servicing of such multiple requests and of tracking such multiple statuses by, for example, employing multiple-bit codes for IR and IE, respectively. Additionally, the invention is not limited to use with the three exemplary subroutines which are disclosed as examples (i.e. Produce Info, Consume Info, Update Count), but is applicable to a wide variety of routines and subroutines that may become nested in responding to interrupt requests.

What is claimed is:

1. In the operation of a processor having the capability of performing nested subroutines in response to requested interrupts, a method of servicing said interrupts comprising:
   a. providing an indicator representing a current interrupt enable status;
   b. saving status data including said indicator;
   c. placing the current interrupt enable status in a disabled state;
   d. at least beginning performance of an action designated by the requested interrupt;
   e. before accepting another interrupt request:
      i. reading the indicator from the saved status data;
      ii. placing the current interrupt enable status in the state indicated by said indicator.

2. A method as in claim 1 where the status data consists of only said indicator.

3. A method as in claim 1 where the status data is saved by pushing it into a LIFO stack and the indicator is read by popping said data out of said stack.

4. A method as in claim 1 where the processor is capable of simultaneously receiving requests for a plurality of interrupts, said indicator representing a current interrupt enable status for each of said interrupts.

5. In the operation of a processor having the capability of performing nested subroutines in response to requested interrupts, a method of servicing said interrupts for producing and consuming stored information, said method comprising:
   a. providing an indicator representing a current interrupt enable status;
   b. saving status data including said indicator;
   c. placing the current interrupt enable status in a disabled state;
   d. at least beginning performance of an action designated by the requested interrupt;
   e. before accepting another interrupt request:
      i. updating a count of information waiting to be consumed;
      ii. reading the indicator from the saved status data;
      iii. placing the current interrupt enable status in the state indicated by said indicator.

6. A method as in claim 5 where the status data consists of only said indicator.

7. In the operation of a processor having the capability of performing nested subroutines in response to requested interrupts, a method of servicing said interrupts comprising:
   a. providing an indicator representing a current interrupt enable status;
   b. saving status data including said indicator;
   c. placing the current interrupt enable status in a disabled state;
   d. at least beginning performance of an action designated by the requested interrupt;
   e. before accepting another interrupt request:
      i. reading the saved status data;
      ii. placing the current interrupt enable status in the state indicated by said indicator and discarding the remainder of the status data.

* * * * *